(12) United States Patent
Iwamasa

(10) Patent No.: US 6,980,941 B2
(45) Date of Patent: Dec. 27, 2005

(54) METHOD AND COMPUTER PROGRAM PRODUCT FOR REALIZING A SYSTEM SPECIFICATION WHICH IS DESCRIBED IN A SYSTEM DESCRIPTION LANGUAGE

(75) Inventor: Mikito Iwamasa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 907 days.

(21) Appl. No.: 10/059,204

(22) Filed: Jan. 31, 2002

(65) Prior Publication Data

US 2002/0103558 A1 Aug. 1, 2002

(30) Foreign Application Priority Data

Jan. 31, 2001 (JP) .............................. 2001-024889

(51) Int. Cl.[7] .......................... G06F 13/10; G06F 17/50
(52) U.S. Cl. .............................. 703/13; 703/6; 703/14; 703/20; 703/21; 703/22; 703/27; 716/1; 716/2; 716/3; 716/18
(58) Field of Search .............................. 703/13, 14, 20, 703/21, 22, 27; 716/1, 2, 3, 18

(56) References Cited

U.S. PATENT DOCUMENTS

| | | | | |
|---|---|---|---|---|
| 4,918,594 A | * | 4/1990 | Onizuka ....................... | 703/15 |
| 5,537,580 A | * | 7/1996 | Giomi et al. ................. | 716/18 |
| 5,870,588 A | * | 2/1999 | Rompaey et al. ............. | 703/13 |
| 5,995,736 A | * | 11/1999 | Aleksic et al. ................ | 716/18 |
| 6,083,276 A | * | 7/2000 | Davidson et al. ........... | 717/107 |
| 6,370,681 B1 | * | 4/2002 | Dellarocas et al. ......... | 717/110 |
| 6,421,808 B1 | * | 7/2002 | McGeer et al. ................ | 716/1 |
| 6,438,739 B1 | * | 8/2002 | Yamada ........................ | 716/18 |
| 6,466,898 B1 | * | 10/2002 | Chan .......................... | 703/14 |
| 6,597,664 B1 | * | 7/2003 | Mithal et al. ............... | 370/252 |
| 6,701,501 B2 | * | 3/2004 | Waters et al. .................. | 716/3 |
| 6,792,580 B2 | * | 9/2004 | Kawakatsu .................... | 716/3 |

OTHER PUBLICATIONS

Gupta et al., Program Implementation Schemes for Hardware-Software Systems, IEEE 1994.*
Zhu et al., OpenJ: An Extensible Sytem Level Design Language, ACM Jan. 1999.*
Verkest et al., System Level Design Using C++, ACM 2000.*
Mohanty et al., Rapid Ssytem Prototyping, System Modeling, and Analysis in Hardware-Software Codesign Environment, IEEE 1995.*
Rompaey et al., CoWare-A Design Environment for Heterogeneous Hardware/Software Systems, IEEE 1996.*
Miller et al., Hardware/Software CoSynthesis: Multiple Constraint Satisfaction and Compent Retrieval, IEEE 1996.*
Colbert, How RapidPLUS Speeds Development of Embedded Systems That Satisfy Customers, White Paper, Sep. 2000.*

* cited by examiner

*Primary Examiner*—W. Thomson
(74) *Attorney, Agent, or Firm*—Oblon, Spivak, McClelland, Maier & Neustadt, P.C.

(57) ABSTRACT

A system design support system is disclosed, which handles specifications at system level, e.g., a specification of software executed by a computer, specification of hardware implemented by combining semiconductor devices and the like, a specification of an incorporated system implemented by combining software and hardware, and a specification of a business process such as a workflow. This apparatus searches for an advertisement in accordance with an query specification. The apparatus also creates a communication procedure between the query specification and a specification of an advertisement part obtained by a search.

17 Claims, 8 Drawing Sheets

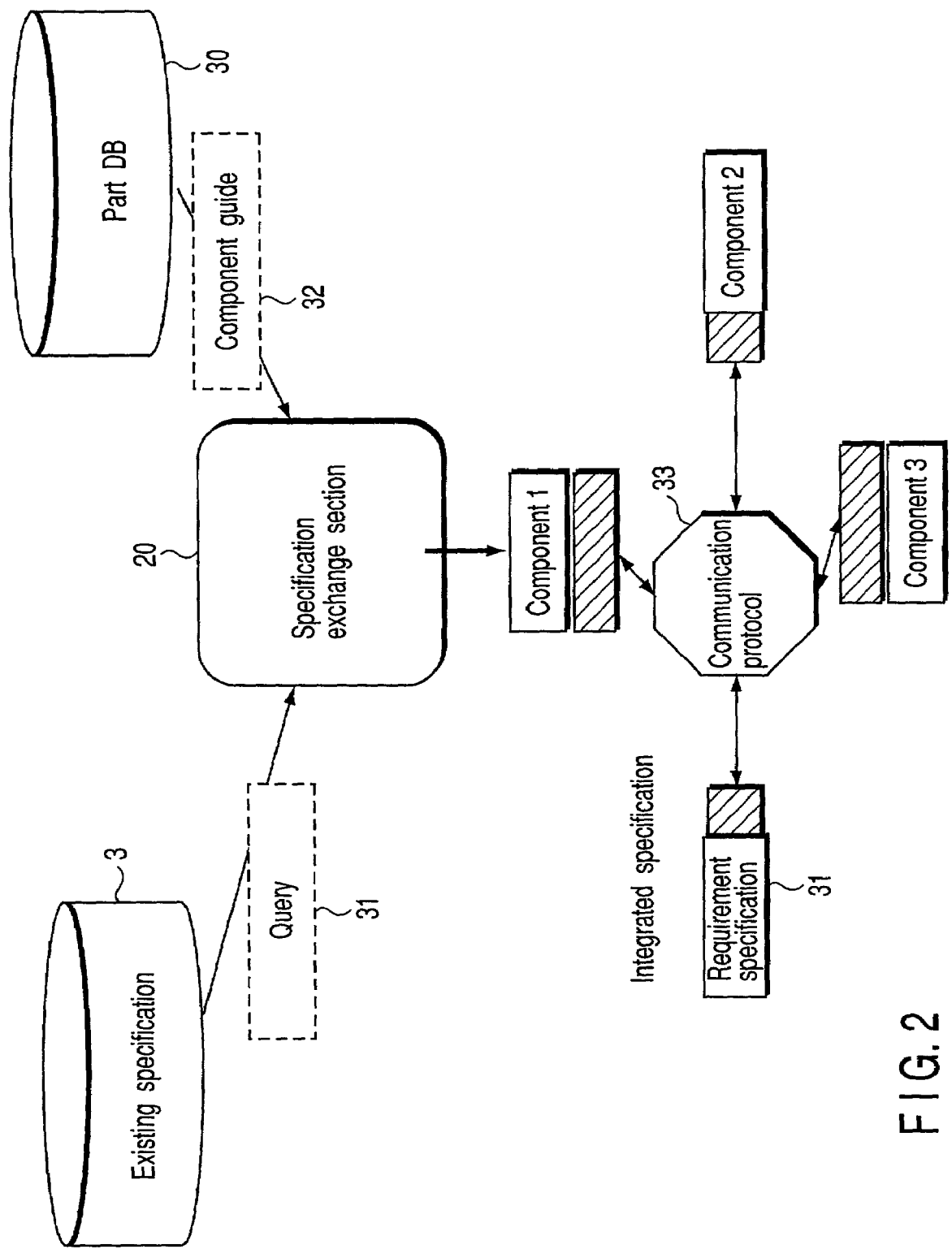
F I G. 2

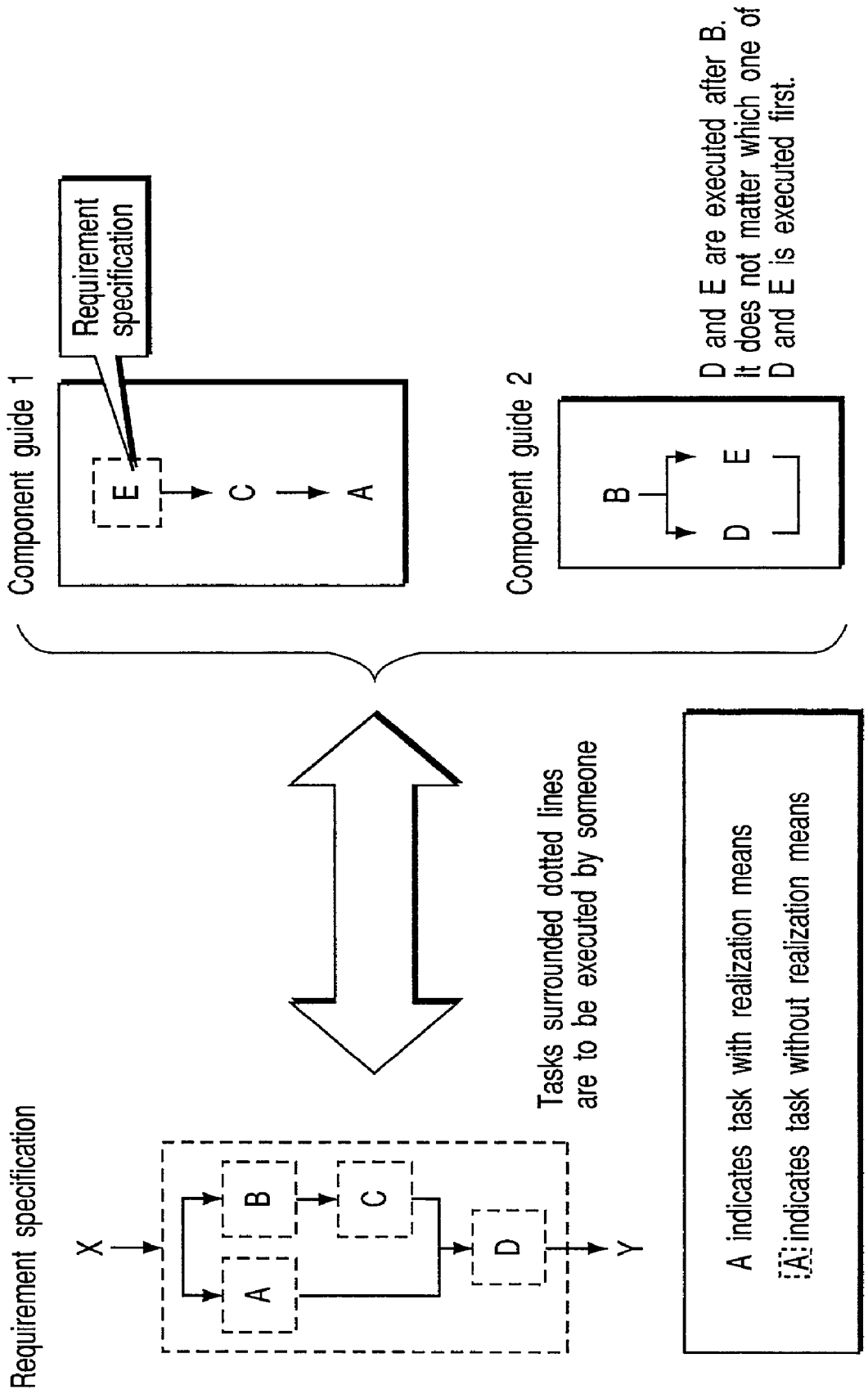
F I G. 6

A indicates task with realization means

A indicates task without realization means

METHOD AND COMPUTER PROGRAM PRODUCT FOR REALIZING A SYSTEM SPECIFICATION WHICH IS DESCRIBED IN A SYSTEM DESCRIPTION LANGUAGE

CROSS-REFERENCE TO RELATED APPLICATIONS

This application is based upon and claims the benefit of priority from the prior Japanese Patent Application No. 2001-024889, filed Jan. 31, 2001, the entire contents of which are incorporated herein by reference.

BACKGROUND OF THE INVENTION

1. Field of the Invention

The present invention relates to design support for hardware such as a computer and electronic device, software, and a system including a combination of hardware and software.

2. Description of the Related Art

Recently, a system specification description language for describing a specification at system level without discrimination between hardware and software has been developed. With this development of the language, an environment for consistent specification description from a specification at system level to specified software or hardware specifications based on the same specification format has been improving. A rapid prototyping tool (Rapid or BetterState) is known, which provides a design environment in an upstream stage of system design while checking a system specification. See "Rapid-plus, White Paper", http://www.e-sim.com/pdf/wht-paper.pdf as a reference for Rapid.

A characteristic feature of such a rapid prototyping tool is that system analysis and design can be seamlessly and quickly performed by using hierarchical state transition diagrams. From the viewpoint of specification design at system level at which a specification implementation method is not clear, this tool has a merit of allowing efficient design by hierarchically combining interrupt execution, sequential execution, and parallel execution.

In order to efficiently perform system design in an upstream stage of design, i.e., a stage where no architecture is determined, a technique of forming a specification at system level into parts and reusing them is indispensable. With a system specification language, the contents (operation) of a system can be described according to a formal specification description rule instead of a natural language. However, no mechanism has been provided, which searches the contents of a specification part on the basis of a specification description at system level so as to reuse it.

The techniques of forming software into parts in the conventional software engineering provide parts designed in detail, i.e., so-called parts at implementation level, and provide users with API (Application Programming Interface) function specifications of parts. The techniques of part formation in consideration of reuse can be used for only predetermined architectures. For example, JavaBeans in a program described in the Java language defines a specification for part formation in a Java execution environment, and hence parts can be reused only within the range of this defined part formation specification. See "Java programming JavaBeans—component framework", Science, (Dec. 1, 1997), ISBN: 4781908624 as a reference for JavaBeans.

According to such conventional techniques associated with formation of software parts, descriptions and classification indexes (indexes) of parts are provided in advance in a natural language, and part search and reuse are realized by searching for parts. However, these technique are not configured to realize part search and reuse in consideration of the contents of software other than those in a natural language.

Demands have arisen for a mechanism for forming a specification at system level, which is created in a system specification description language in the above manner, into parts and reusing them.

BRIEF SUMMARY OF THE INVENTION

It is an object of the present invention to provide a mechanism for forming a specification created in a system specification description language into parts in advance, searching for appropriate parts in a system-level design stage before detailed design, and effectively reusing the parts upon incorporating them into a specification.

According to one aspect of the present invention, there is provided a method for realizing a system specification which is described in a system description language and of which an execution order constraint is defined, by using a plurality of system specification components, the method comprising: retrieving a first system specification component which meets a part of the system specification from the plurality of system specification components; generating another part of the system specification in consideration of the retrieved first system specification component; retrieving a second system specification component which meets the another part of the system specification from the plurality of system specification components; integrating the first system specification component and the second system specification component so that the execution order constraint defined in the system specification is satisfied; and replacing the first system specification component and the second system specification component with the system specification.

BRIEF DESCRIPTION OF THE SEVERAL VIEWS OF THE DRAWING

FIG. 2 is a block diagram schematically showing part formation/reuse operation in the above embodiment;

FIG. 6 is a view showing two advertisement parts corresponding to a given query specification;

DETAILED DESCRIPTION OF THE INVENTION

An embodiment of the present invention will be described below with reference to the views of the accompanying drawing.

Figure 1:
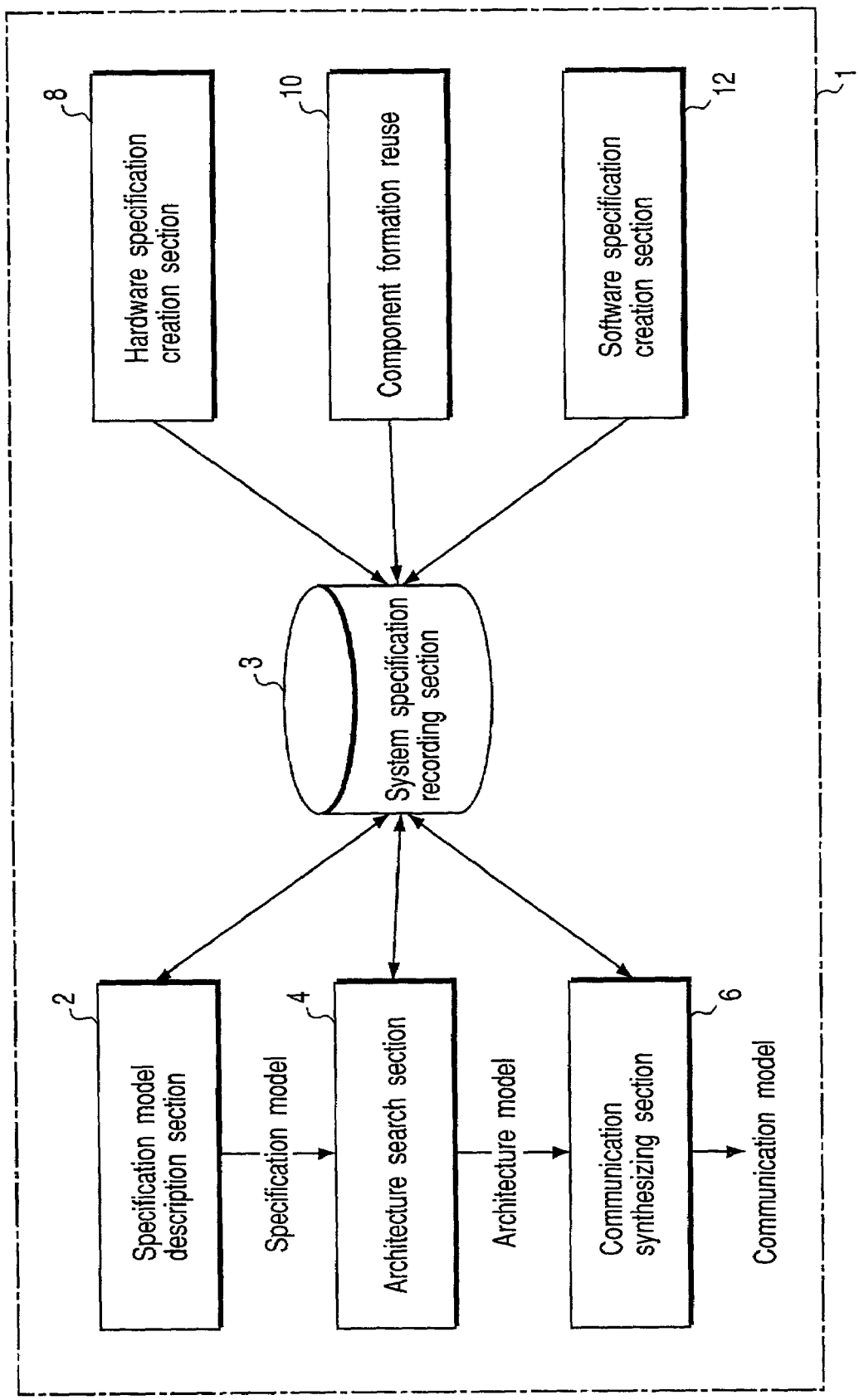
FIG. 1 is a block diagram showing the overall arrangement of a system design support apparatus to which a specification replacement apparatus according to an embodiment of the present invention is applied.

FIG. 1 is a block diagram showing the overall arrangement of a system design support apparatus to which a specification replacement apparatus according to an embodiment of the present invention is applied.

A system design support apparatus 1 shown in FIG. 1 is comprised of a specification model description section 2, system specification recording section 3, architecture search section 4, communication synthesizing section 6, hardware specification creation section 8, part formation/reuse section 10, and software specification creation section 12.

The system design support apparatus 1 of this embodiment handles at system level, e.g., a specification for software executed by a computer, a specification for hardware combined with semiconductor devices and the like, a specification for an incorporated system constituted by a combination of software and hardware, and a specification for a business process such as a work flow.

The specification model description section 2, which is used to design a specification model comprised of specifications for calculation and communication in such specifications at system level, is a section for supporting a designer to describe specifications. When the designer describes specifications for calculation contents and communication contents according to a predetermined specification description form, a specification description model is created. This specification description model includes a specification structure to be described later. Examples of the specification description form are a structured text form represented by a structured programming language, a structural chart form using graphs, and a table form using tables.

The architecture search section 4 divides a partial structure of a supplied specification description model into elements and distributing the elements to architecture elements while maintaining the contents of the specification in consideration of an architecture (the arrangement of a hardware/software implementation environment). More specifically, parts (the constituent elements of a specification description model) constituting specifications for calculation contents and communication contents designed by the specification model description section 2 are assigned to architecture elements (creation of an architecture model).

The communication synthesizing section 6 synthesizes communication procedures between specification elements on an architecture. More specifically, the communication synthesizing section 6 inserts a communication procedure (protocol) between communication specification elements distributed by the architecture search section 4 and performs protocol conversion (rearrangement of a communication procedure) to match with a communication procedure in which the communication content specification is inserted (creation of a communication model).

The system specification recording section 3 associates the specification model created by the specification model description section 2, the architecture model created by the architecture search section 4, and the communication model created by the communication synthesizing section 6 with each other, and records the resultant data as a system specification.

The hardware specification creation section 8 creates a hardware specification from the system specification recorded on the system specification recording section 3.

The software specification creation section 12 creates a software specification from the system specification recorded on the system specification recording section 3.

The part formation/reuse section 10 forms the system specification recorded on the system specification recording section 3 into parts and provides them for reuse in design processes in the specification model description section 2, architecture search section 4, and communication synthesizing section 6.

The system design support apparatus 1 of this embodiment includes at least description elements for describing "sequential execution", "repetitive execution", "interrupt end", "interrupt pause", and "parallel execution", and can describe an overall system specification by hierarchically combining these description elements.

System specification description schemes include StateChart for graphically describing specifications, SpecC (Specification description language based on C) language that expresses specifications in characters as a structural language, and the like. SpecC is described in detail in, for example, Daniel D. Gajski, "SpecC: Specification Language and Methodology", Kluwer Academic Publishers, Dordrecht, ISBNO-7923-7822-9.

In this embodiment, a system specification description scheme will be described below with reference to a description form based on the SpecC language. However, the present invention is not limited to the SpecC language.

<Structure of Specification>

In this embodiment, a specification is comprised of a plurality of basic units called "behaviors". A behavior can have a hierarchical structure. That is, one behavior can have a plurality of other behaviors as lower-level behaviors. A behavior corresponds to a function or class in a software specification; an LSI block in a hardware specification; and a job or task in a business process specification.

"Structure of specification" defines the structure of a specification constituted by behaviors, and is comprised of a hierarchical structure associated with the execution order of behaviors and a hierarchical structure associated with data communication paths between the behaviors. The structure associated with the execution order and the structure associated with the communication paths have the same structure from the hierarchical viewpoint. More specifically, if behavior A is hierarchically higher than behavior B in terms of execution order, behavior A is also hierarchically higher than behavior B in terms of communication paths.

Depending on the structure of a specification, a specification dividing method for an architecture can also be defined. For example, with regard to an incorporated system, the manner in which a specification is divided into portions corresponding to hardware and software is structured and described as a specification.

<Format of Specification>

Of the specification of a specification, a structure associated with an execution order is expressed as a hierarchical structure using at least four classifications of syntactic elements, namely "sequential execution and repetitive execution" (fsm), "parallel execution" (par), "synchronous execution" (fork, join, start, end), and "interrupt execution" (try, trap, itrp). Note that fsm is an abbreviation for finite state machine.

For example, fsm{a, b} expresses a specification stating that "<u>b</u> is executed after <u>a</u> is executed and completed"

par{a, b} expresses a specification stating that "<u>a</u> and <u>b</u> are concurrently executed"

The hierarchical specification, fsm{a, par{b, c}, d}, expresses a specification stating that "b and c are concurrently executed after execution of a, and b is executed after both b and c are completed"

In addition, try{a} trap(e){b} as a specification associated with "interrupt execution" expresses a specification stating that "a is executed first. If event e occurs during execution of a, execution of a is forcibly ended, and execution of b is started"

"Sequential execution and repetitive execution", "parallel execution", "synchronous execution", and "interrupt execution" are necessary minimum elements as means for execution control method definition which are used to describe software, hardware, and business process specifications. A so-called system specification is described by hierarchically combining these elements.

A structure associated with communication paths defines the exchange of data between behaviors. Assume that communication paths are expressed by parts called variables and channels. Variables and channels are defined as parts immediately subordinate to higher-level behaviors in a hierarchical relationship in a specification, and the higher-level behaviors are connected to lower-level behaviors through connection ports called ports, thereby allowing the lower-level behaviors to communicate with each other through communication path.

A communication path corresponds to a variable or a function for communication in a software specification and to an interconnection for connecting LSIs in a hardware specification. A port is an input/output port for communication, which corresponds to an argument in a software specification and to a terminal for connecting parts through an interconnection in a hardware specification. A channel is a part for receiving a command specially prepared to transmit/receive data. For example, commands such as "put (data)" and "get( )" are conceivable. A variable can be regarded as a kind of channel having a write "write(data)" command and read "read( )" command.

Simple syntactic elements and rules of the SpecC language will be described below.

system description=set of "behavior descriptions"
   behavior description={communication element, . . . , processing content}
   where communication element=variable, channel processing content=behavior(port, . . . ).
execution procedure description
   execution procedure description
   =fsm{ . . . }, par{ . . . },
   =try{ . . . }trap(e){ . . . }itrp(e){ . . . }

In the behavior description sample {i, j, k, fsm{A(i), B(i, j), C(k)}, i, j, and k are local variables, and A, B, and C are lower-level behaviors, each having a port, which is connected to a local variable.

par{A, B, C}

This processing content sample indicates that A, B, and C are concurrently executed.

fsm{{1, A, goto(2)},
       {2, B, flg==3: goto(1), flg==1: goto(2)}}

In this case, each element of fsm is formed by any one of
   {label, processing content, {condition: transition upon establishment of condition}, . . . },
   {label, processing content, transition upon completion of processing, . . . },
   {label, processing content} and
   processing content These elements are sequentially executed from the left unless otherwise specified. If there is no transition label item, {label, processing content} executes the next fsm element upon completion of the processing content. Assume that label=1 or the leftmost fsm element is executed first. A transition is expressed by "goto(x): X is label number". For example, goto(1) indicates that the flow returns to the first fsm element.

The above case indicates the following operation. When A is executed and completed, B is executed. When B is completed, A is executed if the value of the variable flg is 3, and B is executed if the value is 1.

As in the following example, an element without any label can be regarded as a simplified form of given execution control using a label.

fsm{A, B, C}=fsm{{1, A, goto(2)}, {2, B, goto(3)}, {3, C, . . . }, . . . }• try{A}trap(ev1) {B}itrp (ev2) {C} . . .

In the case of this language element, A is executed first. If event ev1 occurs during execution of A, A is forcibly ended, and B is executed. If event ev2 occurs during execution of A, A is paused, and C is executed. When C is completed, A is resumed.

Note that each of trap(e){X} and itrp(e2){Y} may be more than one.

wait(ev)

This is synchronous processing which waits for the occurrence of event ev.

notify(ev)

This is synchronous processing that causes event ev.

flg=X

This is a substitution of a value into variable flg.

flg==X

This is condition determination.

start(ID);
       fork(ID);

This is synchronous processing I; start and fork are synchronous executed.

end(ID);
   join(ID);

This is synchronous processing II; end and join are synchronous executed.

The following is a specification sample conforming to the format enumerated above and having a hierarchical structure:

(Example: ex0)
   A:={i, par{B(i), g(i)}}
   B(i):={j, k, fsm{a(j), b(k, i), C(k)}>}
   C(k):={par{d, e, f(k)}}
   This expresses the following specification:

"Behavior A is constituted by sub-behaviors B, C, g, a, b, e, and f, and behavior A is constituted by lower levels B and g. B and g are concurrently executed. B, which is hierarchically lower than A, is constituted by lower-level elements a, b, and C, which are sequentially executed. C, which is hierarchically lower than B, is constituted by lower-level elements d, e, and f, which are concurrently executed. A has communication path i, and port i of B and is connected to port i of g through i. B has communication paths j and k, port j of lower-level element a is connected to communication path j. Port k of b is connected to communication path k, port i of b is connected to port i of B, port k of C is connected to communication path k, and port k of C is connected to port k of f. That is, a behavior f and behaviors b, g and b are connected through communication lines, respectively, to exchange data across hierarchical levels."

For the sake of descriptive convenience, consider a case where communication paths and a hierarchical relationship are simplified in consideration of the execution order. When, for example, the above specification example (ex0) is simplified in consideration of the execution order, a specification can be described as follows:

A:=par{fsm{a, b, par{d, e, f}}, g}

For the sake of descriptive convenience, consider a case where the execution order is simplified in consideration of communication paths and a connection relationship. When the above specification example (ex0) is simplified in consideration of the communication paths and connection relationship, a specification can be described as follows:

A:={i, bh{B(i), g(i)}}
B(k):={i, j, bh{a, (i), b(i, j), C(j)}>}
C(j):={bh{d, e, f(j)}}

Pairs of fork(x) and start(x), and end(x) and join(x) represent a synchronization constraint and define that these elements are always executed in pairs (in this case, $x$ represents an id number, and a pair having identical id numbers are synchronously executed)

For example, the following specification:
par{fsm{1, fork(2), join(2), 3},
fsm{start(2), 2, end(2), 4}} hierarchically indicates that sequential executions (fsm) 1 to 3 and 2 to 4 are concurrently executed (par). Obviously, however, sequential execution 2 is executed between sequential executions 1 and 3 according to the synchronous relationship between for, join, start, and end.

With regard to the structure of communication paths, the above specification example (ex0) indicates that $f$ and $b$ can exchange data with each other through communication path $j$ of B, and $a$, $b$, and $g$ can exchange data with each other through communication path $i$ of A.

FIG. 2 is a block diagram showing an outline of part formation/reuse according to this embodiment.

A specification replacement section 20 according to this embodiment collates a query specification 31 described in the system specification description form with a part advertisement 32 stored in a part database (DB) 30, creates a new query on the basis of the collation result, and makes a search. In addition, the specification replacement section 20 performs communication synthesis to synthesize a communication procedure 33 that satisfies an execution order constraint, and incorporates it in the query specification 31, thereby obtaining an integrated specification. This makes it possible to reuse specification parts.

Figure 3:
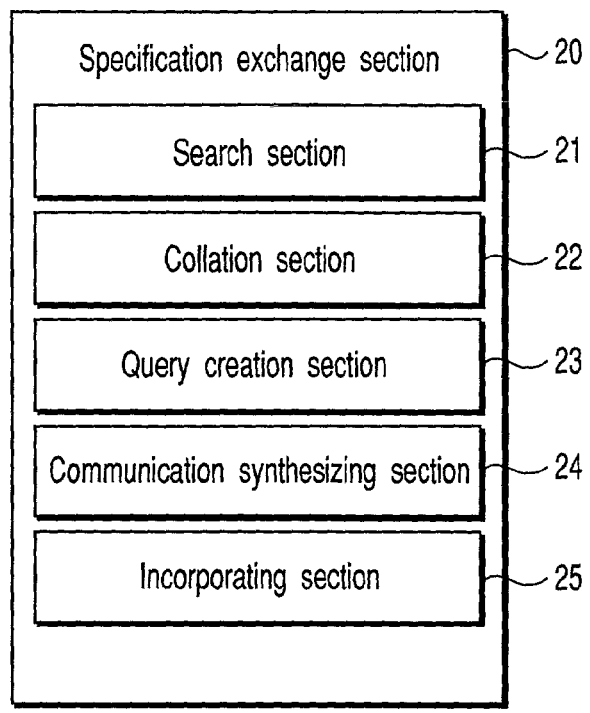
FIG. 3 is a block diagram showing the schematic arrangement of a specification replacement apparatus according to the above embodiment.
Figure 4:
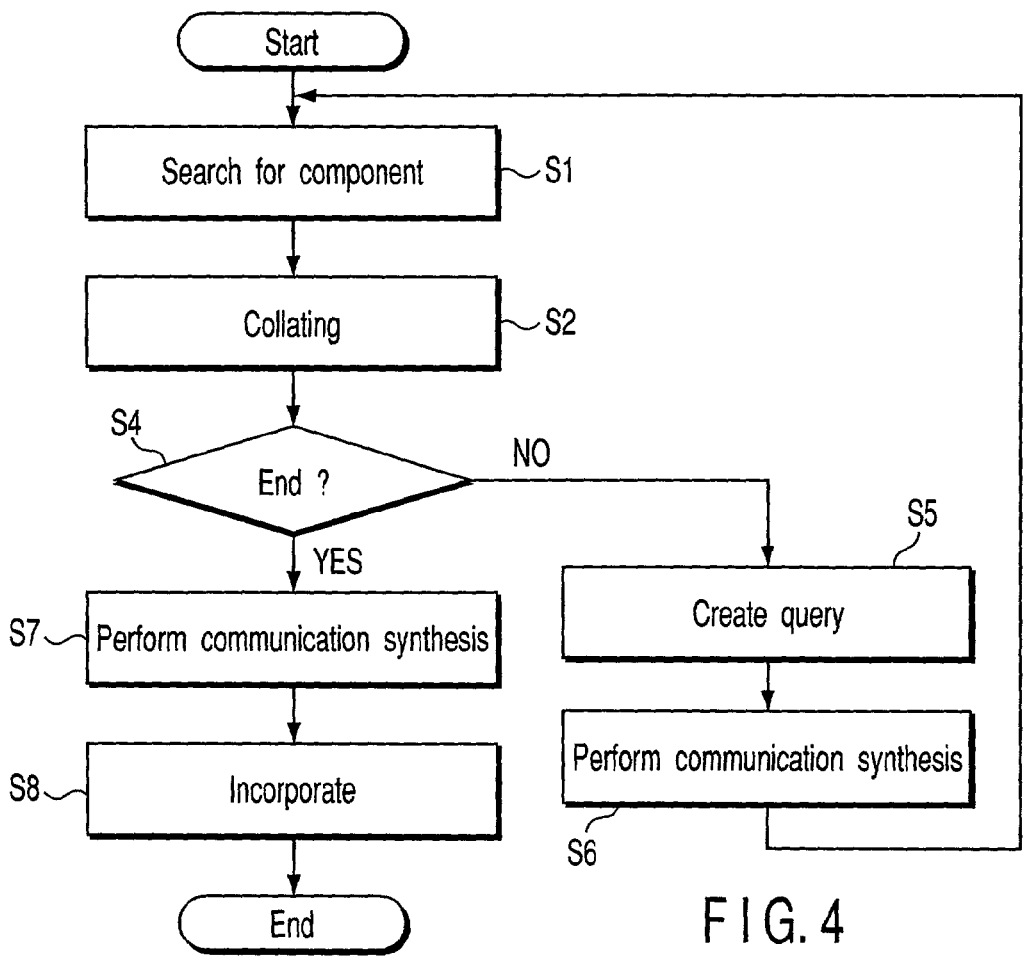
FIG. 4 is a flow chart showing a schematic procedure for part reuse which is executed by the above specification replacement apparatus.

FIG. 3 is a block diagram showing the schematic arrangement of a specification replacement apparatus according to this embodiment. FIG. 4 is a flow chart showing a schematic procedure for part reuse which is executed by the specification replacement apparatus.

As shown in FIG. 3, the specification replacement section 20 of this embodiment includes a search section 21, collation section 22, query creation section 23, communication synthesizing section 24, and incorporating section 25.

The search section 21 searches the part database 30 for a system specification description satisfying a received query (step S1). Collation is performed on the basis of the search result (step S2). If part of the query is satisfied, the corresponding portion is subtracted from the original query to create a new query (step S5). The search section 21 further makes a search, and performs control to sequentially repeat search, collation, and query creation until the initial query specification is finally satisfied (until YES is obtained in step S4).

Upon reception of system specification A and system specification B, the collation section 22 calculates whether one specification satisfies the other specification (step S2). When specification A and specification B are received, and specification B satisfies part of specification A, the query creation section 23 creates new specification A' by removing a portion corresponding to specification B from specification A (step S5). If there is a combination of more than one system specification part which satisfies a query, the communication synthesizing section 24 creates a communication procedure for linking these parts to the original query. In this embodiment, this operation will be called "communication synthesis" (step S6).

The incorporating section 25 performs communication synthesis (step S7), and then synthesizes the specification parts obtained by searches with the communication procedure created by the communication synthesizing section 24, thereby performing replacement in the original query specification (step S8).

The specification replacement section 20 also has a portion for recording/holding "query" 31 of a system-level specification based on the existing specification (system specification recording section 3) shown in FIG. 2 and a portion for recording/holding "advertisement" 32 of a part at system level, which is provided from the database 30, (its description) on a part basis.

<System Specification>

In this specification, a "(system) specification" indicates a specification description for determining the operation of the system at an upstream stage of design at which no implementation method is determined. Assume that the parts of an existing design product are recorded/held, together with a specification at a system design stage corresponding to the parts, and system design is performed while parts are searched out by using them and incorporated in a query specification.

<Extraction of Execution Order from Specification in SpecC Language>

If a specification is structurally described according to the SpecC language, a calculation can be made from information included in the specification to check whether two arbitrary specifications are equivalent according to a criterion. Various criteria are conceivable depending on applications. For example, whether to satisfy an execution order constraint on the tasks included in a specification can be presented as a criterion.

In the SpecC language, a clear order constraint on an execution order is defined as language semantics. On the basis of the language semantics, a graph can be extracted, which expresses an execution order constraint task of an overall specification as a node and an order constraint as an edge. This graph will be called an ETG (Extended Task Graph).

According to an ETG, in addition to an edge associated with an order constraint, a special edge (fork/join) associated with parallel operations is prepared to express parallel operations. Parallel operations according to an ETG indicate that specifications are not described as those that should concurrently move, but it does not matter which moves first.

An ETG can be uniquely extracted from a specification described in the SpecC language. Since parallel operations (par) mean that "it does not matter which moves first", a constraint associated with fork/join does not define an execution order. In consideration of this, in this embodiment, an execution order constraint is expressed by using a pseudo-order relationship "<" (a<b: $a$ is executed after $b$).

Figure 5:
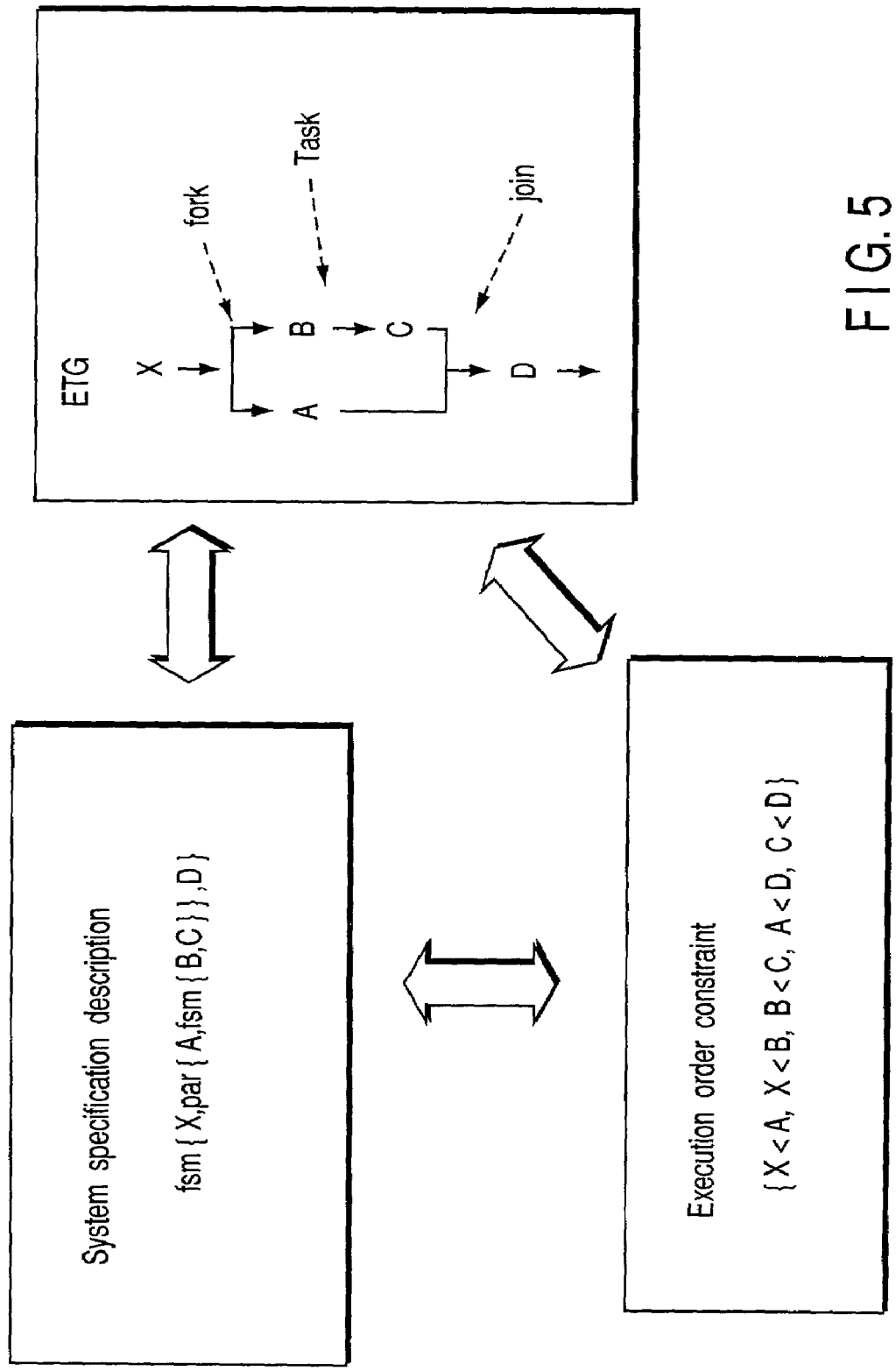
FIG. 5 is a view showing the relationship between a system specification description described in the SpecC language, a description of ETG, and an execution order constraint.

FIG. 5 shows the relationship between the system specification description described in the SpecC language, the ETG description, and the execution order constraint.

<Sufficiency Relationship on Execution Order>

In general, in engineering design, as the design process proceeds, the specification is detailed. With regard to specifications described as parallel operations in design at system level, the parallel operations are scheduled in detailed design to perform detailing such that the operations are sequentially executed in the optimal sequence for implementation. Assume that there are specification A described as parallel operation at system level, and specification B as sequential operation. This specification B is a strong constraint relative to specification A in terms of execution order. This state is defined as "specification B satisfies specification A". That is, "specification B satisfies specification A" is defined as "an execution order constraint on all the tasks included in specification A is also included in the execution order in specification B".

If, for example, an execution order constraint is described with a pseudo-relationship "<",
with respect to
specification A=par{a, fsm{b, c}}
specification B=fsm{a, b, c} an execution order constraint on specification A is
A_seiyaku="b<c"

An execution order constraint on specification A is
B_seiyaku="a<b, b<c"

In this case, since "a<b, b<c" includes "b<c", specification B satisfies specification A.

Likewise, fsm{b, a, c} and fsm{b, c, a} also satisfies specification A.

<Partial sufficiency>

"A partial set of execution order constraints on tasks contained in specification A is contained in an execution order in specification B" is defined as "specification B partially satisfies specification A". For example, with respect to
specification A=par{a, fsm{b, c}}
specification B=fsm{a, c} partially satisfies specification A.

<"Advertisement" and "Guery">

A system specification description based on the SpecC language is used for a search as well as a description of the contents of specification parts. With respect to a past design accomplishment having undergone detailed design, a system-level specification is recorded/held as a database (parts). A specification as a search index (index) for each part in this database will be called "advertisement". An advertisement recording section records/holds the descriptions of "advertisement" at system specification level on a part basis.

If a specification has been designed to a certain degree before detailed design in a design stage for a system specification, this specification under design is used as a search expression. A query recording section records/holds "query" at system specification level.

These "query" and "advertisement" are described on the basis of execution order constraints between tasks. Each task has an attribute associated with feasibility, and the presence/absence of a means for realizing the task is recorded.

In this embodiment, a task with a realization means will be expressed as "a", and a task without any realization means will be expressed as "a~" with the symbol "~" being added. In the drawing, a task surrounded by a dashed line indicates a task without any realization means.

A typical description of "query" is formed by a task without any realization means for all contained tasks, and a typical description of "advertisement" is formed by a task with a realization means for all contained tasks. However, this does not apply to all cases. Such descriptions may include a description in which tasks are partly realized in a query and a description in which tasks are not partly realized in an advertisement.

<Collation>

If the collation section 22 receives specifications A and B and has specification C that partly satisfies both specifications A and B, the collation section 22 determines that specifications A and B are replaceable. In contrast to this, if there is not specification C that partly satisfies both specifications A and B, the collation section 22 determines that "specifications A and B are not replaceable".

If, for example,
specification A=fsm{par{e, b}, d}
specification B=fsm{b, par{d, e}} are provided, since specification C that satisfies both specifications A and B is present
specification C =fsm{b, e, d} specifications A and B are replaceable.

As a method of calculating a specification that satisfies two specifications provided, for example, a method of calculating the sum of order constraints contained in the two specifications is available.

In the above case, for example,
the execution order constraint contained in specification A is
{e<d, b<d}

The execution order constraint contained in specification B is
{b<d, b<e}

The sum of these constraints is
{e<d, b<d, b<e}

In this case, according to the property of pseudo-order relationship <, since the following transitivity rule holds
"if b<e and e<d, then b<d"

{e<d, b<d, b<e} can be simplified into {b<e, e<d}.

If this is expressed in the SpecC description, then specification C=fsm{b, e, d}.

A case where when order constraints are summed, an inconsistency arises from the viewpoint of above constraints is a case where specifications are not replaceable. Although this embodiment has exemplified the case where a calculation is performed by using a set operation using order constraints, the present invention is not limited to this. For example, a similar calculation may be performed by using a graph theory.

<Subtraction of Execution Order Constraints>

Assume that the query creation section 23 receives specifications A and B, specification A contains unrealized task, and a query is to be created on the basis of specification A. In this case, the query creation section 23 removes realized tasks from specification B, and adds tasks that are not contained in specification A, contained in specification B, and not realized in specification B, thereby creating new query specification A'.

Consider an example of the creation of such a query. If, for example, there is advertisement specification B B=fsm{c, a} with respect to the following query specification A

A=fsm{par{a~, fsm{b~, c~}}, d~} then the query creation section 23 subtracts advertisement specification B from query specification A to create new query specification C C=fsm{b~, d~}

Subtraction of a specification in creating a query can be realized by using a set operation for order constraints.

In the above example, execution order constraints can be expressed by pseudo-order relationship "<" as follows:

A_seiyaku={a~<d~, c~<d~, b~<c~}
B_seiyaku={c<a}

Since advertisement specification B contains tasks $\underline{a}$ and $\underline{c}$ with respect to tasks a~ and c~ tasks c~ and a~ are deleted from query specification A.

If "c~" is subtracted from "c~<d~, b~<c~" with attention being given to retain an execution order in query specification A, "b~<d~" is obtained.

Finally, therefore, a constraint of specification C, i.e.,

C_seiyaku{b~<d~} is obtained.

<Search Algorithm>

The search section 21 searches for a specification description that satisfies a provided query specification. If the search result satisfies part of the query specification, the query creation section 23 subtracts the corresponding portion from the original specification to create a new query. The search section 21 further makes a search, and performs control to sequentially repeat "search", "collation", and "query creation" until the query is finally satisfied.

<Communication Synthesis>

If there is a combination of one or more system specification parts that satisfy "query", the communication synthesizing section 24 creates a communication procedure (protocol) required to combine these parts with the original query. More specifically, the communication synthesizing section 24 assembles a communication procedure on the basis of the part searches and collation calculation result log made by the search section 21 and collation section 22.

A communication procedure is assembled by using the above set operation for order constraints.

Assume that with respect to

A=fsm{par{a~, fsm(b~, c~}}, d~} advertisement specification B

B=fsm{e~, c, a} exists, and is searched out by the search section 21, the query creation section 23 subtracts advertisement specification B from query specification A to create C=fsm{par{e~, b~}, d~}

In this case, the communication synthesizing section 24 adds order constraints of two specifications A and B A_seiyaku={a~<d~, c~<d~, b~<c~}
B_seiyaku={e~<c, c<a} with tasks "a~, c~" in specification A being replaced with "a, c" to obtain

{a<d~, c<d~, b~<c, e~<c, c<a}

Since the above element "c<d~" can be calculated by the transitivity rule and is not necessary, this element is deleted to obtain {a<d~, b~<c, c<a, e~<c}

This order constraint corresponds to an execution order. That is, in order to realize query specification A, specification advertisement part B and part X that realizes $\underline{e}$, $\underline{b}$, and $\underline{d}$ that have not been searched out yet are prepared, and the following communication procedure is created: "after tasks b and $\underline{e}$ in part X are executed, tasks $\underline{c}$ and $\underline{a}$ in specification B are executed in the order of c<a, and task $\underline{d}$ in part X is finally executed". In this case, since part X has not been searched out yet, part X is searched out, and the communication synthesizing section 24 corrects the above communication procedure.

<Incorporation of Communication Procedure>

When a final search for a query is completed, the incorporating section 25 combines each part searched out by the search section 21 with the original query through the communication procedure created by the communication synthesizing section 24, and replaces the original query specification with the combined specification.

Note that the part database (DB) 30 may not always be able to provide all the specification parts that satisfies the query. In this case, an embodiment may be configured such that the specification exchange apparatus provides an environment for forming the specification part which is needed.

The needed specification part may be, for example, the specification part that satisfies newly generated query. The specification part also satisfies an execution order constraint defined in the newly generated query. Forming the specification part may be performed when it is determined that the specification part is actually needed as result of the query (retrieval) directed to the advertisements. Otherwise, the specification part may be formed out of relation to the query. That is, the specification part may initially be formed without the query.

An embodiment of reuse of specification parts based on a query will be described in detail below with reference to FIGS. 6 to 10.

As shown in FIG. 6, assuming that with respect to query specification 1=fsm{par{a~, fsm{b~, c~}}, d~}, the following two parts are prepared as advertisements:

advertisement of part 1=fsm{e~, c, a}
advertisement of part 2~fsm{b, par{d, e}}

The search section 21 searches the advertisement recording section for a specification satisfying query specification 1 (step S1 in FIG. 4). The search section 21 then determines that the advertisement of part 1 is partly satisfied (step S2).

Figure 8:
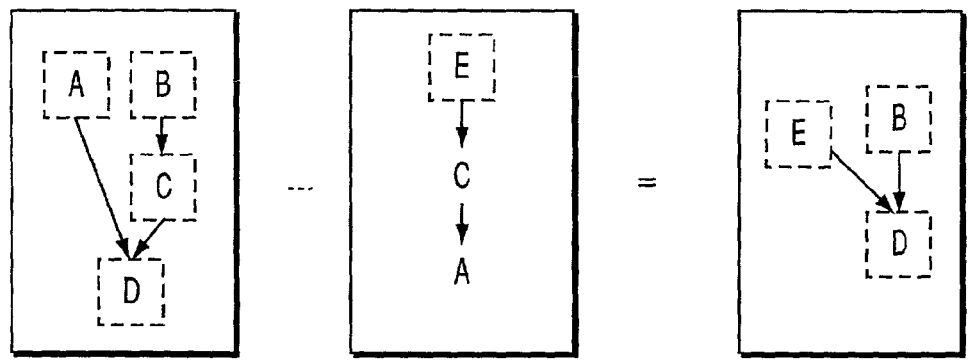
FIG. 8 is a view showing how a subtraction is performed at the time of creation of a query specification.

In this case, as shown in FIG. 8, the query creation section 23 subtracts the advertisement of part 1 from query specification 1 to create the following new query specification 2 (step S5).

query specification 2=fsm{par{e~, b~}, d~}

Figure 7:
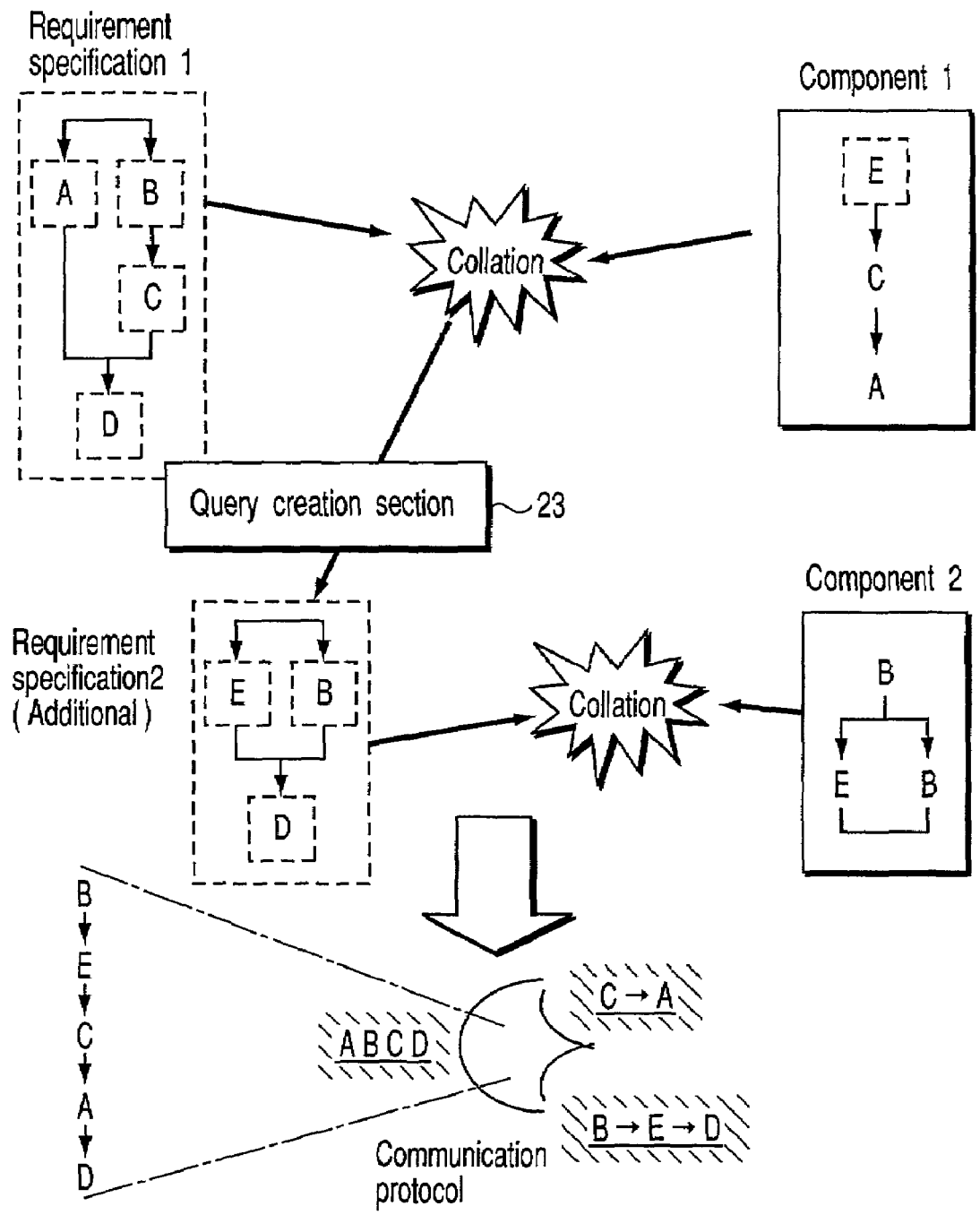
FIG. 7 is a view showing creation of a new query based on a collation result.

FIG. 7 shows created query specification 2.

At this time, the communication synthesizing section 24 obtains communication procedure 1 communication procedure 1={a<d~, b~<c, c<a, e~<c}for incorporating part 1 in query specification 1 (step S6).

When the search section 21 makes a search, the collation section 22 determines that the advertisement of part 2 satisfies query specification 2 (see the lower portion in FIG. 7). As a result, all the tasks contained in query specification 1 are satisfied, and the search section 21 terminates the search (YES in step S4).

Figure 9:
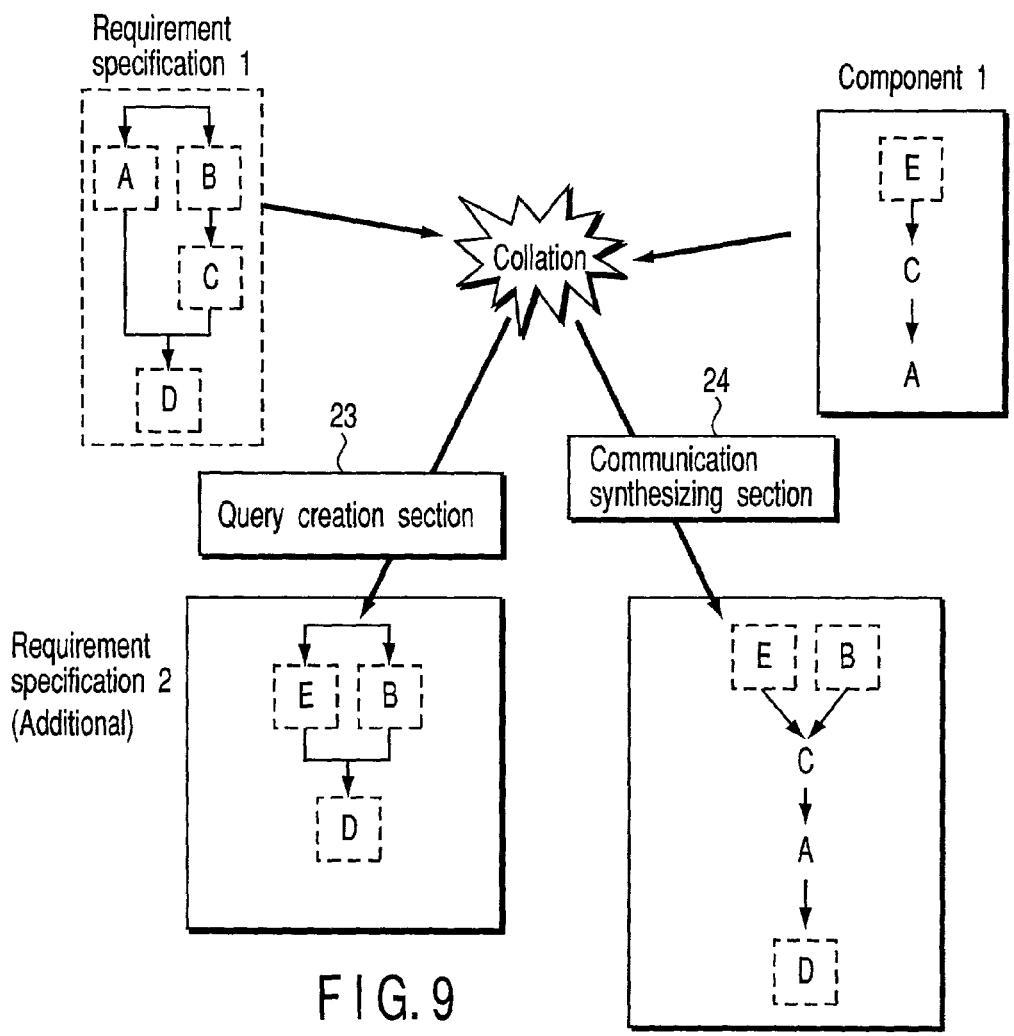
FIG. 9 is a view showing a communication procedure created by a new query and an advertisement part.
Figure 10:
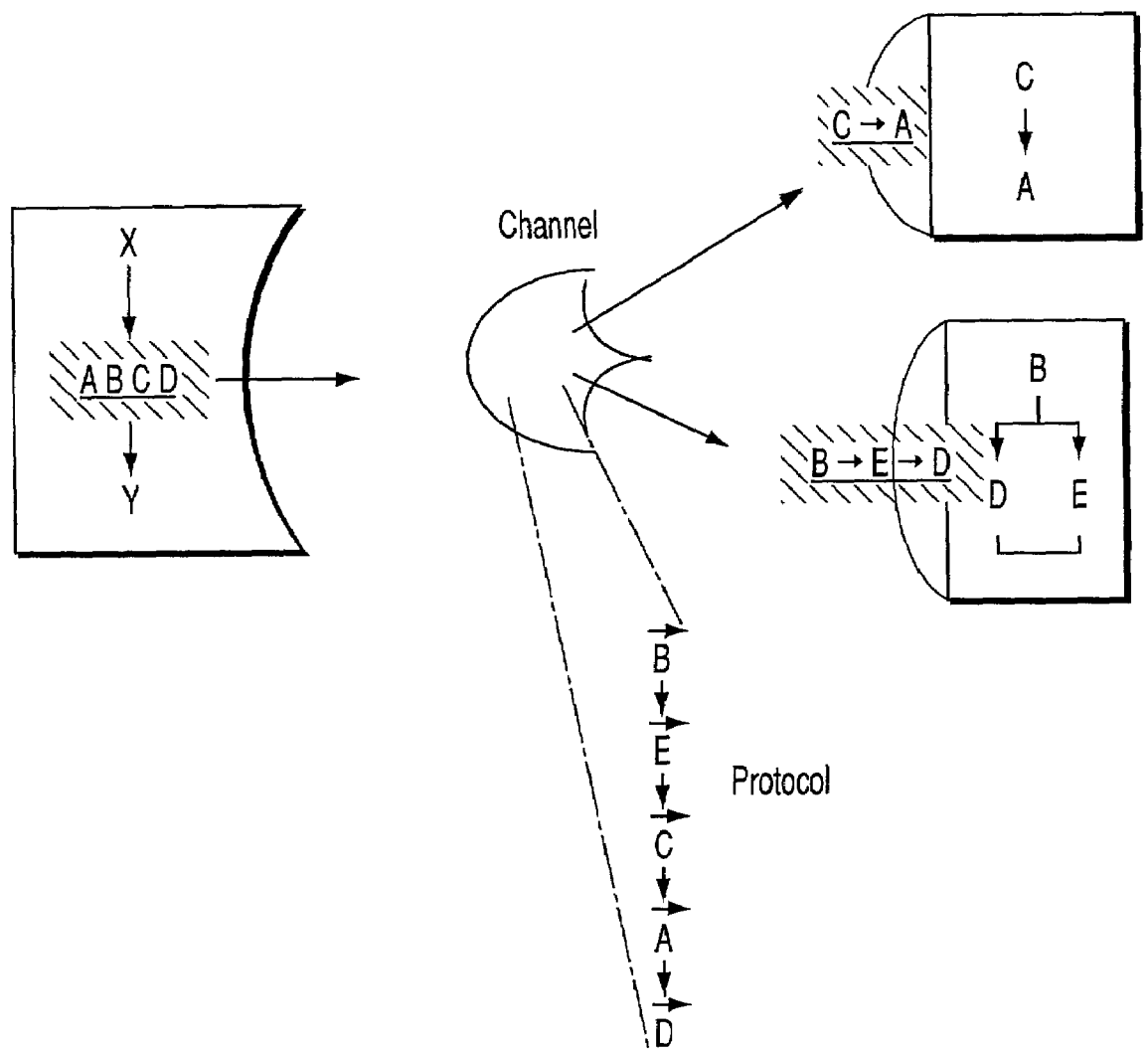
FIG. 10 is a view showing the details of a created communication procedure.

The communication synthesizing section 24 updates communication procedure 1 and creates communication procedure 2, i.e., communication procedure 2={b<e, e<c, c<a, a<d}for incorporating parts 1 and 2 in query specification 1 (step S7) (see FIG. 9). This communication procedure 2 is a communication procedure (protocol) for incorporating parts 1 and 2, i.e., "realizing query 1 by preparing parts 1 and 2 and invoking the functions of parts 1 and 2 in the order of b of part 2, e of part 2, c of part 1, a of part 1, and d of part 2". This communication procedure is implemented as the channels shown in FIG. 10. The channels are means for sequentially invoking the constituent elements of parts (parts for executing a protocol). Such channels may have a hierarchical structure. That is, a given channel may include a channel as its constituent element and may be reused as a part.

Finally, the incorporating section 25 replaces parts 1 and 2 with query specification 1 by using the channels of communication procedure 2 (step S8). Reuse of parts is realized by the above procedure.

As has been described above, according to the specification replacement apparatus according to this embodiment, a specification created in the system specification description language is formed into parts in advance, and appropriate parts are searched out in a design stage at system level before detailed design and incorporated in the specification, thereby allowing reuse of the parts.

<Interrupt>

The above case has not exemplified a case where the structure of a specification includes a description (try/trap/intrp) associated with an interrupt. This is because a description associated with an interrupt is localized in advance, and the localized partial structure can be handled as an individual behavior to allow the description to have a hierarchical structure constituted by only par and fsm with an interrupt structure being omitted as a whole.

For example, the following behavior try{fsm{a, b, c}}trap(e){fsm{d}} indicates a specification stating that "If event e occurs during sequential execution of a, b, and c, the execution of a, b, and c are stopped, and d is executed. If d does not occur, the processing is ended when c is ended." By moving the try/trap structure to a lower level, the structure can be converted into an equivalent specification structure as follows:

par{fsm{try{a}trap(e){flg=1, end(a)},
   try{b}trap(e){flg=1, end(b)},
   try{c}trap(e){flg=1, end(c)},
   flg=0, end(abc)},
fsm{join(a, b, c, abc), flg==0: fsm{d}}}

In this case, the original order constraint is maintained by a synchronous mechanism and the value of the flg flag.

In addition, try/trap can be concealed from a structural viewpoint by creating a macro.

Each function described above can be implemented as software.

In addition, this embodiment can be practiced as a program for causing a computer to execute predetermined means (or causing the computer to function as predetermined means or to realize predetermined functions) or a computer-readable recording medium on which the program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for realizing a system specification which is described in a system description language and of which an execution order constraint is defined, by using a plurality of system specification components, the method comprising:

retrieving a first system specification component which meets a part of the system specification from the plurality of system specification components;

generating another part of the system specification in consideration of the retrieved first system specification component;

retrieving a second system specification component which meets the another part of the system specification from the plurality of system specification components;

integrating the first system specification component and the second system specification component so that the execution order constraint defined in the system specification is satisfied; and replacing the first system specification component and the second system specification component with the system specification.

2. The method according to claim 1, wherein the retrieving comprises:

calculating the sum of an execution order constraint corresponding to the part of the system specification and an execution order constraint of the first system specification component; and determining whether or not a contradiction in an execution constraint is arisen to the sum.

3. The method according to claim 2, wherein the calculation of the sum includes a calculation using set operation.

4. The method according to claim 2, wherein the calculation of the sum includes a calculation using graph algorithm.

5. The method according to claim 1, wherein the generating comprises subtracting the retrieved first system specification component from the system specification to generate the another part of the system specification.

6. The method according to claim 1, wherein the integrating comprises:

generating a first channel of the first system specification component;

generating a second channel of the second system specification component; and generating a communication protocol, which uses the channels.

7. The method according to claim 1, further comprising creating a third specification component which is added to the integrated first specification component and the second specification component so that the execution order constraint defined in the system specification is satisfied.

8. A design support system comprising:

creating a specification model comprised of a specification of a computation and a specification of a communication at a system level;

dividing and distributing partial structures of the specification model into partial elements of a predetermined architecture to create an architecture model;

combining communication protocols between the partial elements of the architecture based on the specification of the communication to create a communication model;

associating the specification model, the architecture model, and the communication model each other, and recording the associated model as a system specification;

generating a hardware specification from the system specification;

generating a software specification from the system specification; and realizing a first system specification, which is described in a system description language and of which an execution order constraint is defined, by using a plurality of system specification components, the method comprising:

retrieving a first system specification component which meets a part of the system specification from the plurality of system specification components;

generating another part of the system specification in consideration of the retrieved first system specification component;

retrieving a second system specification component which meets the another part of the system specification from the plurality of system specification components;

integrating the first system specification component and the second system specification component so that the execution order constraint defined in the system specification is satisfied; and replacing the first system specification component and the second system specification component with the system specification.

9. A computer program product comprising:

a computer storage medium and a computer program code mechanism embedded in the computer storage medium for causing a computer to realize a system specification, which is described in a system description language and of which an execution order constraint is defined, by using a plurality of system specification components, the computer code mechanism comprising:

a computer code device configured to retrieve a first system specification component which meets a part of the system specification from the plurality of system specification components;

a computer code device configured to generate another part of the system specification in consideration of the retrieved first system specification component;

a computer code device configured to retrieve a second system specification component which meets the another part of the system specification from the plurality of system specification components;

a computer code device configured to integrate the first system specification component and the second system specification component so that the execution order constraint defined in the first system specification is satisfied; and a computer code device configured to replace the first system specification component and the second system specification component with the system specification.

10. The computer program product according to claim 9, wherein the retrieving comprises:

calculating the sum of an execution order constraint corresponding to the part of the system specification and an execution order constraint of the first system specification component; and determining whether or not a contradiction in an execution constraint is arisen to the sum.

11. The computer program product according to claim 10, wherein the calculation of the sum includes a calculation using set operation.

12. The computer program product according to claim 10, wherein the calculation of the sum includes a calculation using graph algorithm.

13. The computer program product according to claim 9, wherein the generating comprises subtracting the retrieved first system specification component from the system specification to generate the another part of the system specification.

14. The computer program product according to claim 9, wherein the integrating comprises:

generating a first channel of the first system specification component generating a second channel of the second system specification component; and generating a communication protocol, which uses the channels.

15. The computer program product according to claim 9, further comprising creating the first specification component or the second system specification component.

16. A computer program product comprising:

a computer storage medium and a computer program code mechanism embedded in the computer storage medium for causing a computer to support, the computer code mechanism comprising:

a computer code device configured to create a specification model comprised of a specification of a computation and a specification of a communication at a system level;

a computer code device configured to divide and distribute partial structures of the specification model into partial elements of a predetermined architecture to create an architecture model;

a computer code device configured to combine communication protocols between the partial elements of the architecture based on the specification of the communication to create a communication model;

a computer code device configured to associate the specification model, the architecture model, and the communication model each other, and to record the associated model as a system specification;

a computer code device configured to generate a hardware specification from the system specification;

a computer code device configured to generate a software specification from the system specification; and a computer code device configured to realize a first system specification, which is described in a system description language and of which an execution order constraint is defined, using a plurality of system specification components, comprising:

a computer code device configured to retrieve a first system specification component which meets a part of the first system specification;

a computer code device configured to generate a second system specification corresponding to another part of the first system specification in consideration of the retrieved first system specification component;

a computer code device configured to retrieve a second system specification component which meets a part of the second system specification; and a computer code device configured to integrate the first system specification component and the second system specification component so that the execution order constraint defined in the first system specification is satisfied, and to replace the first system specification component and the second system specification component with the first system specification.

17. A method for realizing a system specification which is described in a system description language and of which an execution order constraint is defined, by using an existing system specification components, the method comprising:
    preparing a first system specification component which meets a part of the system specification from the existing system specification components;
    generating another part of the first system specification in consideration of the first system specification component;
    creating a second system specification component which meets the second system specification;
    integrating the first system specification component and the second system specification component so that the execution order constraint defined in the system specification is satisfied; and
    replacing the first system specification component and the second system specification component with the system specification.

* * * * *